United States Patent
Smyers

(10) Patent No.: US 6,430,629 B1
(45) Date of Patent: Aug. 6, 2002

(54) METHODS AND APPARATUS FOR MONITORING A 1394 HOME NETWORK

(75) Inventor: Scott David Smyers, San Jose, CA (US)

(73) Assignees: Sony Corporation; Sony Electronics, Inc., both of Tokyo (JP)

(*) Notice: Subject to any disclaimer, the term of this patent is extended or adjusted under 35 U.S.C. 154(b) by 0 days.

(21) Appl. No.: 09/337,207

(22) Filed: Jun. 10, 1999

(51) Int. Cl.$^7$ ............................................. G06F 13/14
(52) U.S. Cl. ........................ 710/15; 709/205; 714/12
(58) Field of Search .......................... 710/15, 18, 19, 710/5; 709/205; 714/12

(56) References Cited

U.S. PATENT DOCUMENTS

| | | | | |
|---|---|---|---|---|
| 5,136,233 A | * | 8/1992 | Klinkenberg et al. | 323/343 |
| 5,504,863 A | * | 4/1996 | Yoshida | 714/47 |
| 5,592,881 A | * | 1/1997 | Rabjohns | 101/483 |
| 5,793,366 A | * | 8/1998 | Mano et al. | 345/329 |
| 5,896,503 A | * | 4/1999 | Badovinatz et al. | 709/201 |
| 5,909,591 A | * | 6/1999 | Brooke | 710/9 |
| 5,923,673 A | * | 7/1999 | Henrikson | 714/712 |
| 5,958,020 A | * | 9/1999 | Evoy et al. | 710/3 |
| 5,996,030 A | * | 11/1999 | Ofer | 710/19 |
| 6,012,084 A | * | 1/2000 | Fielding et al. | 709/205 |
| 6,012,115 A | * | 1/2000 | Chambers et al. | 710/105 |
| 6,069,581 A | * | 5/2000 | Bell et al. | 342/70 |
| 6,141,702 A | * | 10/2000 | Ludtke et al. | 710/5 |
| 6,160,796 A | * | 12/2000 | Zou | 370/257 |
| 6,188,973 B1 | * | 2/2001 | Martinez et al. | 702/188 |
| 6,202,210 B1 | * | 3/2001 | Ludtke | 725/20 |
| 6,226,701 B1 | * | 5/2001 | Chambers et al. | 710/105 |

* cited by examiner

Primary Examiner—Jeffrey Gaffin
Assistant Examiner—Abdelmoniem Elamin
(74) Attorney, Agent, or Firm—Finnegan, Henderson, Farabow, Garrett & Dunner, L.L.P.

(57) ABSTRACT

A 1394 home network monitor for gathering information on the state of nodes within a IEEE 1394 home network, and storing the generated information. The IEEE 1394 standard is an Institute of Electrical and Electronics Engineers (IEEE) standard for a high speed serial bus for connecting multiple electronics devices. An IEEE 1394 home network, for example, uses the 1394 IEEE standard to connect multiple devices, referred to as nodes, within a home. Some of these devices autonomously change state over time, and such state changes may involve controlling other devices in the home network. An example of such a home network may include a central controller which turns on a Set Top Box (STB) and a VCR at a pre-programmed time in order to record a program.

18 Claims, 2 Drawing Sheets

1394 HOME NETWORK MONITOR AND VARIOUS NODES IN THE HOME NETWORK

METHODS AND APPARATUS FOR MONITORING A 1394 HOME NETWORK

BACKGROUND OF THE INVENTION

The present invention relates to networks, and more particularly, to a monitor for a 1394 home network.

The IEEE 1394 standard is an Institute of Electrical and Electronics Engineers (IEEE) standard for a high speed serial bus for connecting multiple electronic devices. An IEEE 1394 Home Network uses the IEEE 1394 standard to connect multiple devices, each referred to as a node, within a home. Some of these devices autonomously change state over time, and such state changes may involve other devices in the home network. An example of such a home network may include a central controller which turns on a Set Top Box (STB) and a VCR at a pre-programmed time to record a program.

Another example of a possible device in a 1394 Home Network is a temperature sensing device in the home network that reads at any time the current temperature at its location. Further examples include security devices, such as a motion detector or video monitor.

At present, such networks do not periodically collect dynamic information from selected devices in the home network and form a central log for the convenience of a user who wishes to know the history of changes of certain devices over a period of time. Such operations would be very useful to many network users.

SUMMARY OF THE INVENTION

Accordingly, the present invention is directed to a 1394 home network monitor that substantially obviates the problems of prior art 1394 network configurations.

In accordance with the purposes of the invention, as embodied and broadly described herein, the invention comprises a network monitor, including a device for obtaining information by monitoring the state of devices in a 1394 Home Network, and means for storing the obtained information.

The summary of the invention and the following detailed description should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

DETAILED DESCRIPTION OF THE INVENTION

Reference will now be made in detail to embodiments of the invention, examples of which are illustrated in the accompanying drawings. Wherever possible, the same reference numbers will be used throughout the drawings to refer to the same or like parts.

Figure 1:
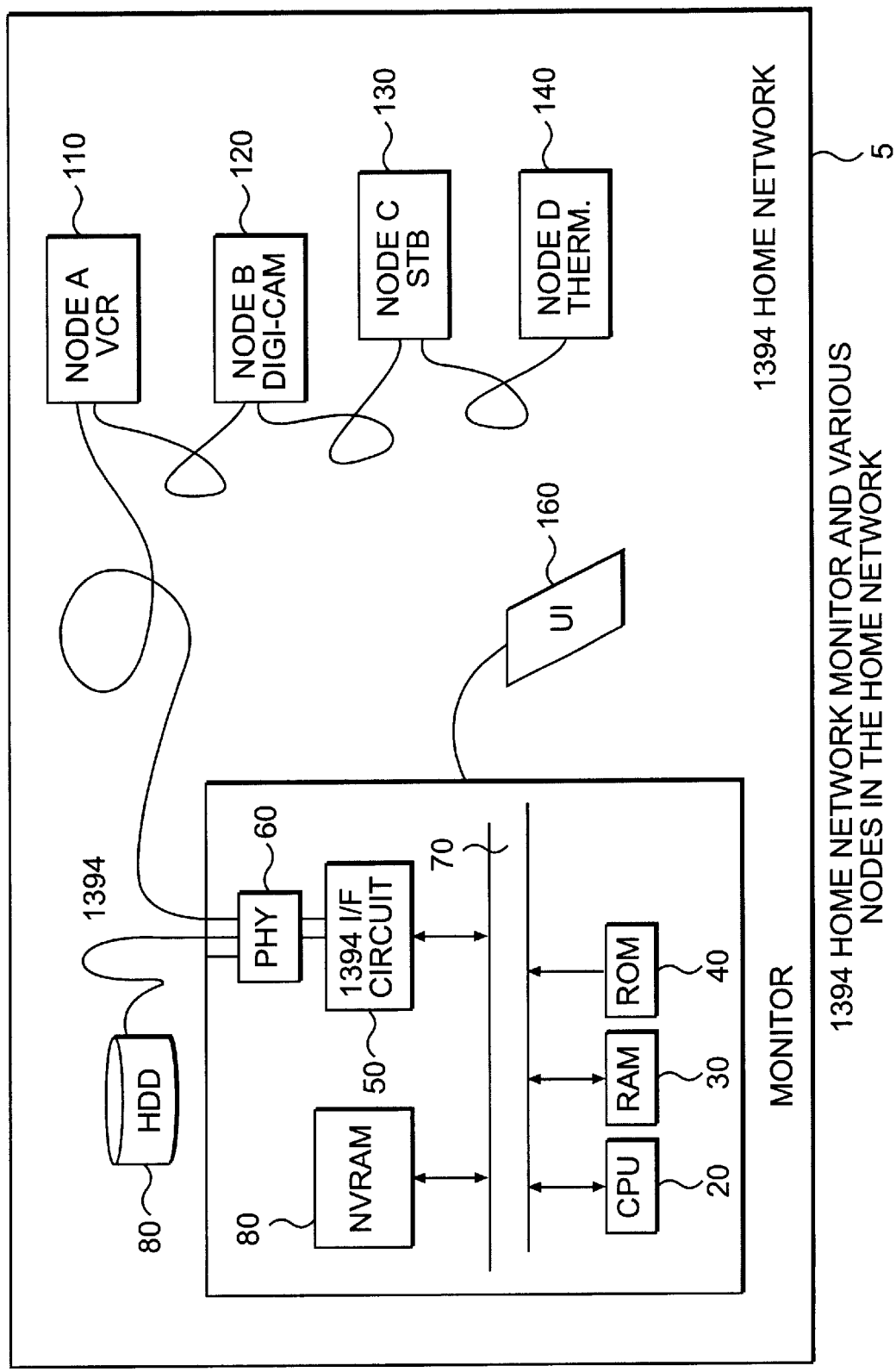
FIG. 1 is a block diagram of a 1394 Home Network Monitor connected to a 1394 home network, consistent with the invention.

As shown in FIG. 1, in a preferred embodiment, a 1394 home network monitor 10 includes a Central Processing Unit (CPU) 20, Random Access Memory (RAM) 30 for use by the CPU during its operation, Read-Only Memory (ROM) 40 to hold program instructions and or information, a 1394 interface circuit 50, and a physical interface 60 for linking the home network monitor to the 1394 home network 5. All of these elements are connected to each other through a system bus 70, such as Peripheral Component Interconnect (PCI) or another suitable bus structure.

The monitor 10 is connected to a 1394 home network having multiple nodes. As shown in FIG. 1, these nodes can include, e.g., a VCR 110, a digital camera 120, a set top box (STB) 130, and a thermometer 140.

In addition, the monitor 10 of a preferred embodiment includes storage 80 for storing information over time. In one embodiment, storage 80 is normal system RAM. In another embodiment, storage 80 is some sort of non-volatile storage facility, such as nonvolatile RAM, flash RAM or a hard disk drive (HDD). This non-volatile storage could be implemented physically inside the same enclosure that houses the monitor itself, or external to the monitor and connected to the monitor's internal system bus 70 via the 1394 interface or some other means.

Also, shown in FIG. 1 is a user interface 160 that provides a means for configuring the monitor based on a user's preferences or other criteria. This user interface function can be implemented in a wide variety of ways. For example, the user interface can connect a PC running suitable software to the monitor and the rest of the home network via a 1394 connection. In another embodiment, the user interface 160 can connect a stand alone wireless device to the monitor via IR or RF signals. Further, in another embodiment, a user interface 160 can be built directly into the monitor 10 itself.

By means of the user interface 60, a user can instruct the monitor 10 to monitor the states of the various nodes in the 1394 Home Network and record the information in the storage means 80. For example, a user can instruct the monitor to monitor the states of the VCR 110 and STB 130 every five minutes, and monitor the temperature every 30 minutes by obtaining the temperature from thermometer 140. In addition, the user, for example, can instruct the monitor to instruct the digital camera 120 to capture a digital image and send it to the storage device every fifteen minutes. The monitor can also be configured to perform periodic control functions. For example, in order to capture an image from the digital camera 120, the monitor must first instruct the digital camera 120 to capture the image and transfer it.

After being configured, the monitor 10 performs the specified periodic monitoring and control functions and creates a log of the information gathered. As the monitor 10 gathers each piece of information, it writes it into storage 80, such as the HDD 80. When a home user so desires, he or she can examine the information log stored in storage 80, view the stored digital images, confirm that the VCR 110 and STB 130 recorded a movie, or examine the temperature fluctuations during the monitoring period.

Figure 2:
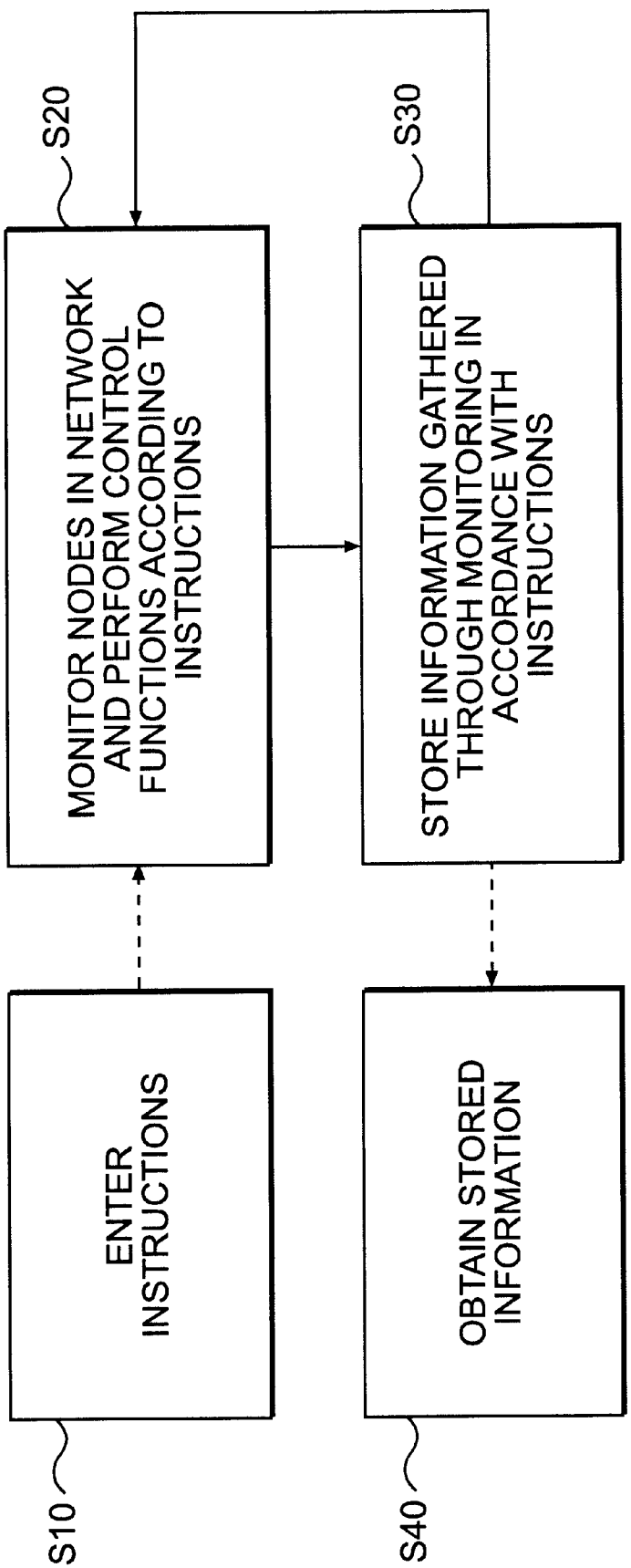
FIG. 2 is a flow chart of a method for monitoring 1394 home network nodes, consistent with the invention.

FIG. 2 is a flow chart of a method for monitoring 1394 home network nodes, consistent with the invention. In step S10 a user, preferably, enters instructions through a user interface for the monitor, such as instructions to monitor the states of the various nodes in the 1394 home network. These instruction can, for example, include instruction to monitor the states of the VCR 110 and STB 130 every five minutes, and instructing the digital camera 120 to capture a digital image and send it to storage 80 every ten minutes.

In step S20, the monitor 10, preferably, monitors the states of the various nodes and performs control functions according to the entered instructions. After the monitor 10 obtains the information, the monitor 10, preferably, stores the obtained information in storage 80 in accordance with the entered instructions. After the information is stored S30, the monitor, preferably, continues monitoring the nodes and performing control functions S20, consistent with the entered instructions.

In a preferred embodiment, at any point a user can re-enter instructions in step S10. After which, the monitor, preferably, will monitor the nodes in the network and perform control functions S20 consistent with new instructions, and then store, consistent with the new instructions, the obtained information in storage 80.

In a preferred embodiment, at any point a user can access the stored information S40. Preferably, a user accesses the information through user interface 160, which in a preferred embodiment includes a touch screen. In other embodiments, the user interface 160 is a computer or personal digital assistant.

While it has been illustrated and described what is at present considered to be the preferred embodiment and methods of the present invention, it will be understood by those skilled in the art that various changes and modifications may be made, and equivalents may be substituted for elements thereof without departing from the true scope of the invention.

In addition, many modifications may be made to adapt a particular element, technique or, implementation to the teachings of the present invention without departing from the central scope of the invention. Therefore, it is intended that this invention not be limited to the particular embodiment and methods disclosed herein, but that the invention includes all embodiments falling within the scope of the appended claims.

What is claimed is:

1. A network monitor, comprising
    means for receiving instructions from a user regarding periodically obtaining information from one or more devices in an IEEE 1394 network including a specified rate for obtaining the information;
    means for periodically obtaining, in accordance with the user instructions, information from one or more devices in the IEEE 1394 network at the specified rate; and
    means for storing the obtained information.

2. The network monitor of claim 1,
    wherein the means for storing the obtained information includes a non-volatile storage means selected from the group consisting of a hard-disk drive, flash Random Access Memory, and non-volatile Random Access Memory.

3. The network monitor of claim 1, wherein the means for receiving instructions includes a user interface.

4. The network monitor of claim 3, wherein the user interface includes a touch screen.

5. The network monitor of claim 1, wherein the obtained information includes a historical log.

6. The network monitor of claim 1, further comprising means for accessing the stored information.

7. The network monitor of claim 6, wherein the means for accessing the stored information includes a user interface.

8. The network monitor claim 7, wherein the user interface includes a touch screen.

9. A method for monitoring a network, comprising the steps of:
    receiving instructions from a user regarding periodically obtaining information from one or more devices in an IEEE 1394 network including a specified rate for obtaining the information;
    periodically obtaining information, in accordance with the user instructions, from one or more devices in the IEEE 1394 network at the specified rate; and
    storing the obtained information.

10. The method of claim 9,
    wherein the obtained information is stored in a non-volatile storage means selected from the group consisting of a hard disk drive, flash Random Access Memory, and non-volatile Random Access Memory.

11. The method of claim 9, wherein the information received from the user is received via a user interface, further comprising the step of:
    transmitting information to the user interface regarding the information obtained from the one or more devices.

12. The method of claim 11, wherein the user interface includes a touch screen.

13. The method of claim 9, wherein the obtained information includes a historical log.

14. The method of claim 9, further comprising the step of accessing the stored information.

15. The method of claim 14, wherein the means for accessing the stored information includes using a user interface.

16. The method of claim 15, wherein the user interface includes a touch screen.

17. A network monitor operable on an IEEE 1394 network including a plurality of devices, comprising:
    a central processor that is capable of receiving information from a user interface regarding instructions from a user to obtain information from one or more devices in the IEEE 1394 network, wherein the obtained information includes a specified rate for obtaining the information; and wherein the central processor is capable of executing instructions in order to periodically obtain information from one or more devices in the IEEE 1394 network at the specified rate, in accordance with the user's instructions;
    a memory for storing the information from the one or more devices;
    an interface for connecting the network monitor to the IEEE 1394 network; and
    a bus for interconnecting the central processor, memory and interface.

18. The network monitor of claim 17, further comprising:
    the user interface for receiving the instructions from the user; wherein the user interface is capable of displaying information to the user regarding the information obtained from the one or more devices.

* * * * *

UNITED STATES PATENT AND TRADEMARK OFFICE
CERTIFICATE OF CORRECTION

PATENT NO.    : 6,430,629 B1               Page 1 of 1
DATED         : August 6, 2002
INVENTOR(S)   : Scott David Smyers It is certified that error appears in the above-identified patent and that said Letters Patent is hereby corrected as shown below:

<u>Column 4,</u>
Line 1, after "monitor" insert -- of --.

Signed and Sealed this

Fourth Day of February, 2003

JAMES E. ROGAN
*Director of the United States Patent and Trademark Office*